No. 729,698. Patented June 2, 1903.

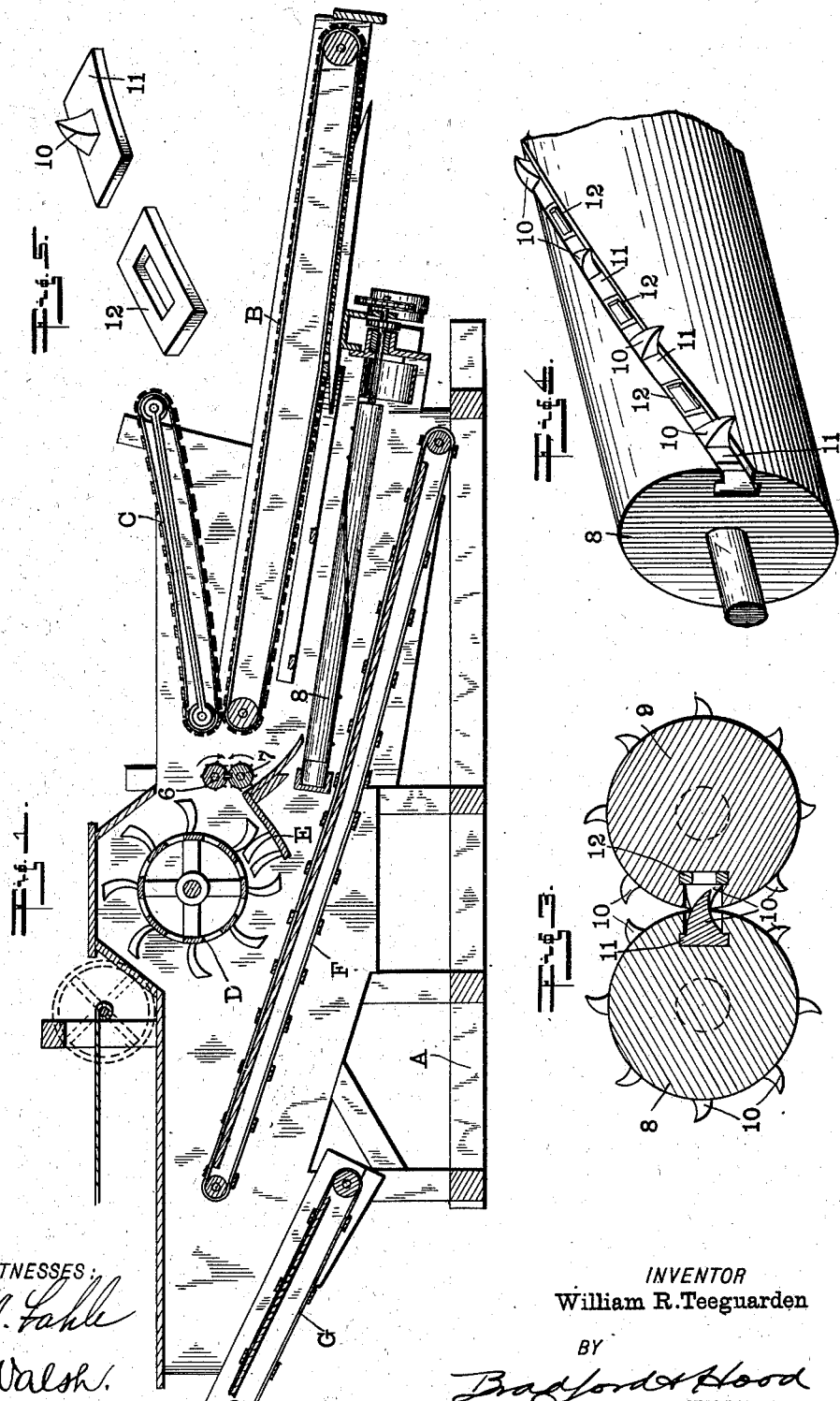

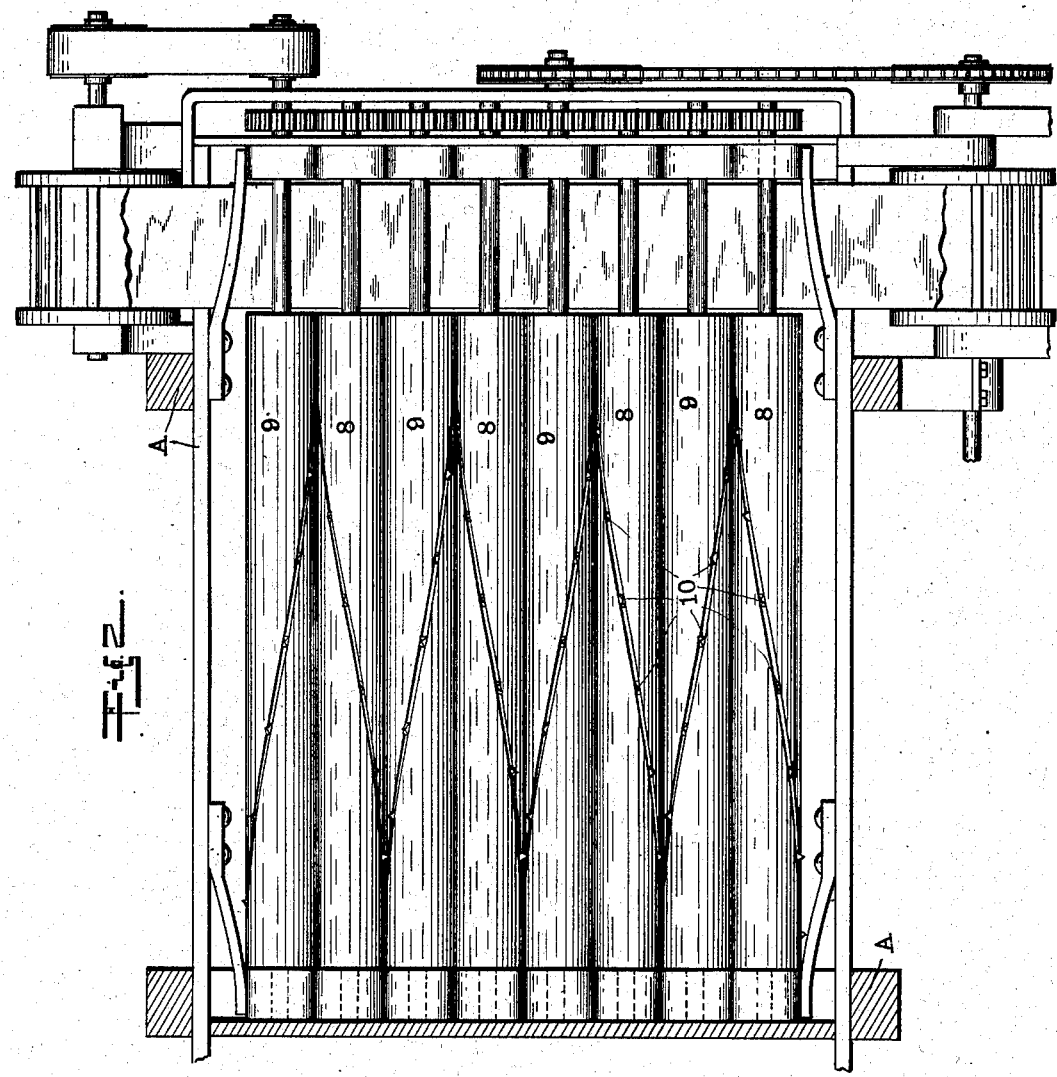

UNITED STATES PATENT OFFICE.

WILLIAM R. TEEGUARDEN, OF INDIANAPOLIS, INDIANA.

ROLLS FOR CORN-PREPARING MACHINES.

SPECIFICATION forming part of Letters Patent No. 729,698, dated June 2, 1903.

Application filed May 23, 1902. Serial No. 108,627. (No model.)

*To all whom it may concern:*

Be it known that I, WILLIAM R. TEEGUARDEN, a citizen of the United States, residing at Indianapolis, in the county of Marion and State of Indiana, have invented certain new and useful Improvements in Rolls for Corn-Preparing Machines, of which the following is a specification.

My present invention relates to that class of machines for preparing or treating corn in the stalk commonly denominated "corn huskers and shredders;" and it consists in certain improvements in the rolls of such machines, known as the "husking-rolls" and the "snapping-rolls," said invention being applicable to both these two sets of rolls or to other rolls of like design and similar purpose.

Referring to the accompanying drawings, which are made a part hereof and on which similar reference characters indicate similar parts, Figure 1 is a longitudinal vertical sectional view of so much of a corn-husking and fodder-shredding machine as illustrates the location and arrangement of the several rolls therein adapted to be constructed in accordance with my invention and the adjacent and coöperating parts; Fig. 2, a top or plan view of the husking-rolls in said machine and immediately adjacent parts when said rolls are constructed in accordance with my present invention; Fig. 3, a transverse sectional view of one pair of said rolls, showing my preferred construction thereof; Fig. 4, a perspective view of a fragment of one of said rolls, and Fig. 5 a perspective view of one of the grasping-teeth and also of one of the spacers which are inserted between the adjacent teeth in assembling the roll.

In said drawings the portions marked A represent the framework of a machine of a character suitable to embody my invention; B and C, the feeding-belts; D, the shredding-cylinder; E, the shredding-concave, and F and G off-bearing conveyers. These parts, however, not being of my present invention are shown merely for purposes of illustration and will not, therefore, be further described herein except incidentally in describing the invention.

Generally speaking, my improvement consists in forming the otherwise cylindrical rolls with spirally-disposed longitudinal grooves in their faces and placing within said grooves the grasping-teeth, which engage with the stalks of corn in the case of snapping-rolls or with the husks on the ears in the case of husking-rolls. These rolls are so positioned in use that the grooves containing the teeth in each pair of rolls register with each other, so that the two grooves are effective at the same point at substantially the same moment, while the teeth come into play in succession, one following another sufficiently close to bite the stalks or husks between them.

The snapping-rolls 6 and 7 and the various pairs of husking-rolls 8 and 9 may each be and preferably are constructed in accordance with my present invention. Each of said rolls, as shown, has a longitudinal groove extending in a spiral direction from end to end thereof along its surface, and in these grooves are placed teeth 10. These teeth may be of any desired construction and secured in place in any desired manner. I have shown the bottom of the groove widened and the teeth provided with bases 11, fitting into the widened bottom portion of the groove and held at the proper distance apart by spacing-blocks 12, similar in form to the bases of the teeth, and this I consider a desirable construction; but any other form of these parts and means for securing them in place may be adopted which may be desired without departing from my invention.

As above stated, the grooves in each of the pairs of rolls are arranged to register with each other. This has the effect of greatly increasing the grasping capability of the rolls as they revolve. Just before the coöperating parts of the grooves reach the position directly facing each other, as shown in the transverse section, Fig. 3, they may be said to constitute a single grasping or biting groove composed of the upper side of one groove and the lower side of the other, which is adapted to seize upon the portions of the cornstalks which may be presented thereto and grasp them tightly and draw them through the rolls when ordinary smooth-surfaced rolls would slip over the large hard portions of the stalks presented thereto without grasping them, whereas my rolls are capable of receiving stalks of irregular shapes or of unusually large growth. The remaining portions of the surfaces of the rolls being suitably roughened, this especialy in the case of the snapping-rolls, has a tendency to crush the cornstalks, and thus better prepare them for the action of the shredding cylinder and concave. In all cases the result is to more certainly and rapidly feed the material through between the rolls, as the grasp in question is prompt and certain.

Having thus fully described my said invention, what I claim as new, and desire to secure by Letters Patent, is—

The combination, in a corn-preparing machine, of a pair of rolls geared to revolve in opposite directions toward each other, and each provided with a spiral groove in its surface running in the opposite direction from the groove in the other, said grooves registering with each other, whereby a continuously grasping or biting groove formed of the opposite sides of the grooves in the said two rolls is provided, and teeth seated in the grooves in each of said rolls and projecting into the corresponding grooves in the opposing rolls, substantially as set forth.

In witness whereof I have hereunto set my hand and seal at Indianapolis, Indiana, this 19th day of May, A. D. 1902.

WILLIAM R. TEEGUARDEN. [L. S.]

Witnesses:
ARTHUR M. HOOD,
JAMES A. WALSH.